T. S. ROLLO.
AUTOMOBILE SAFETY SIGNAL.
APPLICATION FILED OCT. 9, 1915.
1,272,535.
Patented July 16, 1918.
2 SHEETS—SHEET 1.
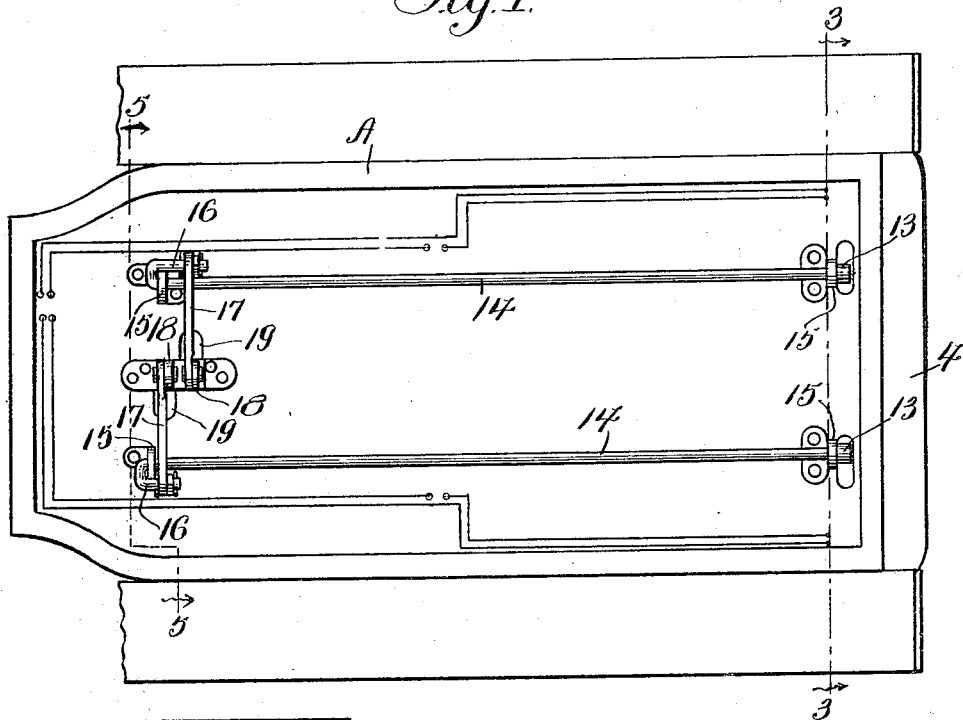
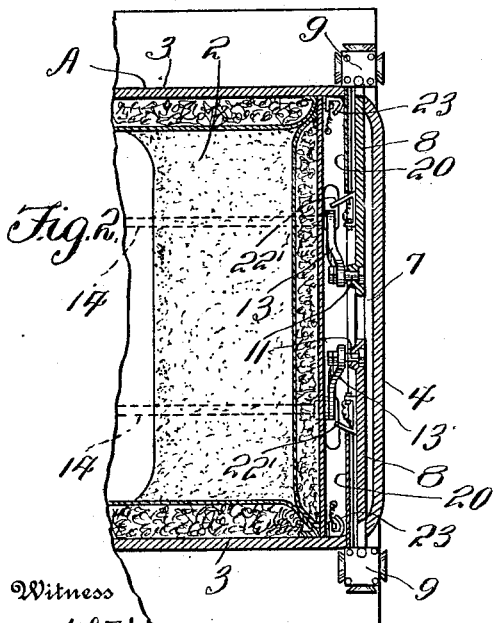
Inventor
T. S. Rollo
By Victor J. Evans
Attorney T. S. ROLLO.
AUTOMOBILE SAFETY SIGNAL.
APPLICATION FILED OCT. 9, 1915.
1,272,535.
Patented July 16, 1918.
2 SHEETS—SHEET 2.
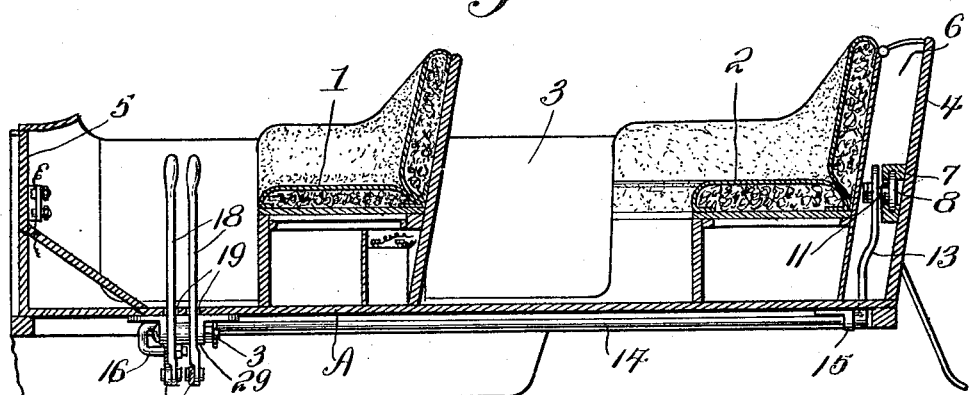
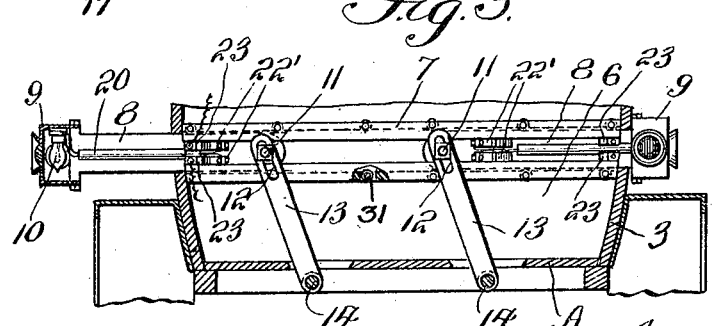
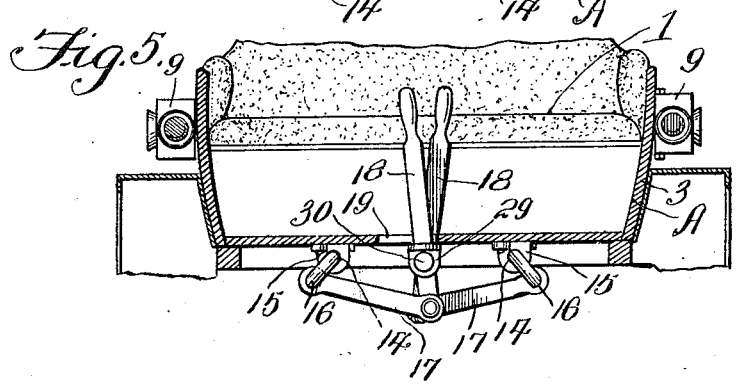
Inventor
T. S. Rollo
By Victor J. Evans
Attorney
Witnesses

UNITED STATES PATENT OFFICE.

THOMAS SCOTT ROLLO, OF GALVESTON, TEXAS.

AUTOMOBILE SAFETY-SIGNAL.

1,272,535.            Specification of Letters Patent.     Patented July 16, 1918.

Application filed October 9, 1915. Serial No. 55,070.

*To all whom it may concern:*

Be it known that I, THOMAS S. ROLLO, a citizen of the United States, residing at Galveston, in the county of Galveston and State of Texas, have invented new and useful Improvements in Automobile Safety-Signals, of which the following is a specification.

This invention relates to automobile safety signals, the object in view being to provide in combination with the body of an automobile or other vehicle, signaling means which in the preferred embodiment of the invention comprises a plurality of signaling lamps shiftable with respect to the side lines of the vehicle body, together with selective means whereby one or more of said lamps may be projected beyond the side line or lines of the vehicle body and simultaneously energized so as to display signals in accordance with the schedule of signals adopted by any particular municipality.

The signal controlling means is within ready reach of the operator or driver of the machine who may thereby clearly and unmistakably indicate to other machines, vehicles and also traffic policemen and pedestrians, the direction in which he is about to make a turn or impart information to the effect that he is about to slow down and bring the machine equipped with the signal to a stop.

With the above and other objects in view, the invention consists in the novel construction, combination and arrangement of parts, as herein described, illustrated and claimed.

In the accompanying drawings:—

Figure 1 is a bottom plan view of a vehicle body showing the application of the present invention thereto.

Fig. 2 is a horizontal section through the rear portion of the vehicle.

Fig. 3 is a vertical cross section on the line 3—3 of Fig. 1 taken in advance of the sliding arms and looking toward the same.

Fig. 4 is a vertical longitudinal section through the body showing the operating shafts and the parts associated therewith.

Fig. 5 is a vertical cross section on the line 5—5 of Fig. 1 looking toward the lever connections.

Referring to the drawings A designates generally the body of a vehicle such as that now commonly employed in automobiles, 1 designating the front seat, 2 the rear seat, 3 the sides of the body, 4 the rear end wall of the body and 5 the front end wall or dash.

It is preferred to construct the vehicle body in such a way that a transversely elongated space 6 is left between the rear seat and the rear end of the body, a portion of the signaling operating means being mounted in said space. Extending longitudinally of the space 6 is a stationary guide 7 in which are mounted slidable lamp supporting arms 8 to the outer extremities of which are fastened lamps 9 each comprising in connection with a suitable lamp case, a contained electric lamp or bulb 10. Each lamp carrying arm is provided with a laterally extending stud 11 which is received in a longitudinal slot 12 in the upwardly extending shifting arm 13 at the rear extremity of a rock shaft 14 which extends longitudinally of the vehicle body and is journaled in bearings 15 on the under side thereof. In view of the fact that two lamps 9 are employed, there will be two rock shafts 14 which will preferably be arranged in substantially parallel relation to each other. The shafts 14 extend to a point under the floor in advance of the front seat of the machine and after passing through the forward bearings 15 the end portions of said shafts are recurved or bent rearwardly and also offset in a downward direction to form crank arms 16 which are connected by means of inwardly extending pivotal links 17 to the lower extremities of a pair of manually operable levers 18 which move in transverse planes through the slots 19 in the floor of the vehicle, the upper ends of said levers being arranged within convenient reach of the operator while in his seat.

The connections just hereinabove described are such that when one of the levers 18 is pressed to the left, it will actuate the left hand lamp 9 and slide the same to a projecting position and when the operator moves the other lever to the right, the right hand lamp will be projected beyond the side line of the vehicle body. He may thus project either or both of said lamps as occasion may require.

Each of the slidable lamp supporting arms 8 carries a tubular housing 20 extending longitudinally thereof and through which the wires lead from the respective bulb 10 to a pair of spring fingers or contacts 22' which are secured to and carried by said arm. Other spring fingers or contacts 23 are secured to the body of the vehicle and arranged in the path of contacts carried by the adjacent lamp supporting arm. The contacts 23 are connected by wires to binding posts and contacts on a switch board shown for convenience as fastened to the rear side of the dash of the vehicle.

Any desired code of signals may be adopted in connection with the signals hereinabove described. For instance, the left hand lamp may be of a red color and the right hand lamp of a green color. When the green lamp is projected, it indicates that the vehicle is going to make a right hand turn and when the red lamp is projected it indicates that a left hand turn is about to be made. If both of the lamps are simultaneously projected, it will indicate that speed is to be reduced or the machine brought to a stop. When the lamps are projected, they are discernible at various angles both from the front and rear of the machine by which they are carried. This results in a particularly safe signaling device and does away with the necessity of multiplying the number of lamps by having some at the rear and others at the front of the machine. It is preferred to arrange the lamps and their supporting arms in such manner that when they are in their retracted positions, they lie within the side lines of the vehicle body where they are not liable to be broken or injured. It is also desirable in some cases to employ anti-friction rollers in connection with the slidable lamp supporting arms, said rollers being indicated at 31 and serving to reduce to a minimum the friction on the slidable arms and the tendency of said arms to bind in their sliding movement.

Having thus described my invention, I claim:—

The combination with the body of a vehicle, of a pair of lamps positioned normally within the side lines of the vehicle at the rear of the vehicle body, a horizontally disposed lamp-supporting arm for each lamp slidable in the direction of its length, guiding means for said arms housed within the vehicle body, and selective means for imparting a sliding movement to said arms independently of each other to project and retract the respective lamp, said means comprising parallel rock shafts extending in a fore and aft direction under the vehicle body in spaced relation to each other, arms fast on the rear extremities of said rock shafts extending through slots in the bottom of the vehicle body, and having a jointed connection at their free ends with said lamp-supporting arms, cranks at the forward extremity of said arms, independently operable levers arranged in front of the driver's seat, and extending through the floor of the vehicle, and links extending in opposite directions from said levers to the last named crank arms.

In testimony whereof I affix my signature in presence of two witnesses.

THOMAS SCOTT ROLLO.

Witnesses:
THOS. F. BRIDEWELL,
C. W. HIGGINS.

Copies of this patent may be obtained for five cents each, by addressing the "Commissioner of Patents, Washington, D. C."